United States Patent [19]

Kraxner et al.

[11] 4,203,689
[45] May 20, 1980

[54] SELF-ADJUSTING POWER DISTRIBUTOR

[75] Inventors: István Kraxner; Antal Sebök; János Steiner, all of Budapest; József Tóth, Almasfuzito, all of Hungary

[73] Assignee: Aluminiumpari Tervezo es Kutato Intezet, Budapest, Hungary

[21] Appl. No.: 905,171

[22] Filed: May 10, 1978

[51] Int. Cl.² .................. B65G 53/40; F27B 15/08
[52] U.S. Cl. .................. 406/123; 422/145; 406/130; 406/138; 432/58
[58] Field of Search ............ 23/252 R; 302/28, 53; 432/58, 106; 422/129, 139, 143, 145; 406/90, 123, 130, 132, 138

[56] References Cited

U.S. PATENT DOCUMENTS

| | | | |
|---|---|---|---|
| 1,411,072 | 3/1922 | Wagstaff | 302/28 |
| 1,674,454 | 6/1928 | Smith | 302/28 |
| 2,715,018 | 8/1955 | Lapple et al. | 302/53 X |
| 3,223,456 | 12/1965 | Sonnenschein | 302/53 X |
| 3,306,671 | 2/1967 | Leeman | 302/28 X |
| 3,361,539 | 1/1968 | Pyzel | 432/58 X |
| 3,427,008 | 2/1969 | Geoffroy | 432/58 X |
| 3,652,131 | 3/1972 | Carlsson | 302/28 |

*Primary Examiner*—Joseph Scovronek
*Assistant Examiner*—Roger F. Phillips
*Attorney, Agent, or Firm*—Young & Thompson

[57] ABSTRACT

A self-adjusting powder distributor—which is particularly intended for use with alumina calcination apparatus—comprises a casing with a permeable partition, a plurality of outlets, and means for introducing preheated hydrate above the partition and fluidizing air therebelow. The fluidized hydrate withdraws through outlets of the casing for further treatment or partly as final product. The casing is provided with means by which the amounts and mutual ratios of the withdrawing material can be adjusted according to preselected values by altering the cross-sectional flow area or the level of the outlets.

2 Claims, 8 Drawing Figures

SELF-ADJUSTING POWER DISTRIBUTOR

This invention relates to self-adjusting powder distributors, particularly for alumina calcination apparatus.

BACKGROUND OF THE INVENTION

Present day apparatus for the calcination of alumina may be subdivided in three groups as follows:

(a) Drying and preheating of the aluminium-oxide-hydrate obtained from bauxite is carried out in cyclones whereas annealing takes place in rotary or revolving furnaces. The product obtained thereby is cooled in planet coolers, cooler drums and the like.

(b) Both drying and preheating of the hydrate as well as cooling of the product take place in cyclones while annealing is carried out in rotary or revolving furnaces.

(c) Drying, preheating and heating is carried out in cyclones whereas annealing takes place in special reactors. Cooling of the product is carried out by cyclones and fluidisation coolers.

Though alumina consisting entirely of Gamma modification is particularly suitable for metallurgical purposes, practically, such concentration cannot be obtained and, therefore, products are aimed at which—in addition to the Gamma modification—contain only Alpha modification and that in relatively small amounts with respect to the Gamma modification.

The alumina calcination apparatus of the groups (a) and (b) have the common characteristic feature that the calcined alumina produced thereby comprises the entire spectrum of the various crystalline modifications. This is due to the hydrate passing the heating means very quickly and within a time interval of 1 to 2 minutes during which it is heated to a temperature of 400 to 500 degrees centigrade. A further heating to a temperature of 1200 degrees centrigrade is carried out in rotary or revolving muffle furnaces which work under very favourable operational conditions. The dwell time of the work material in such furnace can be altered by means of changing the speed of furnace rotation. Nevertheless, some particles or grains of the work material may fail to be heated to desired temperatures or the dwell time required for thermal decomposition may be unduly short though the temperature is of the desired value.

Such inconveniences are absent with apparatus of the third group (c) of the known alumina calcination apparatus comprising a reactor in which more suitable thermal conditions for annealing can be obtained. In addition, the dwell time of the work material may be adjusted within wide limits. As a result, alumina of a suitable proportion of Gamma and Alpha modifications can be produced. However, the alumina calcination apparatus of the group (c) require an intricate automatic unit for discharging the produced alumina.

SUMMARY OF THE INVENTION

The invention aims at alumina calcination apparatus ensuring a dwell time in the hydrate heating unit which is necessary for obtaining homogeneous products. Furthermore, its object is the provision of simple means for discharging the alumina from the apparatus.

In compliance with the main feature of the invention, this is obtained by means of a self-adjusting powder distributor which comprises a closed casing with an inlet and a plurality of outlets. The outlet edges of the outlets are situated at the same level. The bottom portion of the casing is formed so as to be suitable for loosening the powder supplied into the casing. The outlets of the casing have dischargers connected to them.

It will be shown that the employment of such distributor in any of the known alumina calcining apparatus of the groups (a) or (c) will result in a favourable proportion between Alpha and Gamma modifications of the produced alumina. More particularly, the powder distributor according to the invention ensures with known alumina calcination apparatus of the groups (a) and (b) the dwell time in the hydrate heating unit which is required for obtaining homogenous products. With alumina calcination apparatus of the group (c) it permits a simple discharge of the alumina from the apparatus without difficulties and without the necessity of employing intricate devices of automatic operation. Nevertheless, the quality of the product remains unaltered. The operation of the powder distributor according to the invention is self-adjusting.

Preferably the work material discharger will be represented by chutes. Moreover, the distributor may be provided with one or more control plates which serve for adjusting the discharge area of the outlets. It is also possible to provide the distributor with means by which the level of the discharge edges of the outlets may be adjusted.

Further details of the invention will be described with reference to the accompanying drawings which show various exemplified embodiments of the distributor according to the invention and its employment in alumina calcination apparatus.

BRIEF DESCRIPTION OF THE DRAWING

In the drawing.

Same reference characters refer to similar details in the description and the drawing.

DESCRIPTION OF THE PREFERRED EMBODIMENTS

Figure 1:
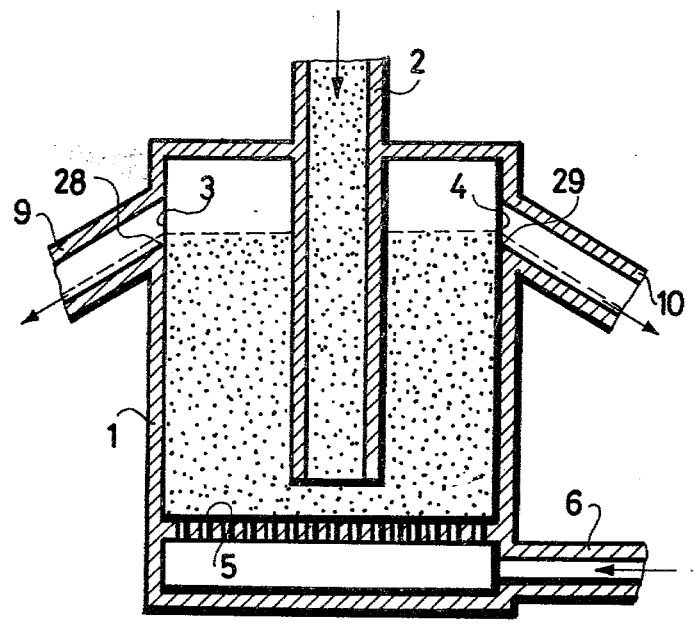
FIG. 1 is a vertical sectional view of a powder distributor according to the invention.

In the drawing, FIG. 1 shows that the new powder distributor has a casing 1 with an inlet 2 for supplying a work material into it. A pair of outlets 3 and 4 permit a discharge of the work material from the casing 1 as shown by unspecified arrows. The outlets 3 and 4 have work material dischargers in the form of chutes 9 and 10, respectively, connected to them. The bottom part of casing 1 comprises a permeable partition 5 which separates an upper work material chamber from a lower air chamber. The air chamber receives air from an air conduit 6. The outlets 3 and 4 define with the dischargers or chutes 9 and 10 discharge edges 28 and 29, respectively, which occupy positions at the same level.

Figure 2:
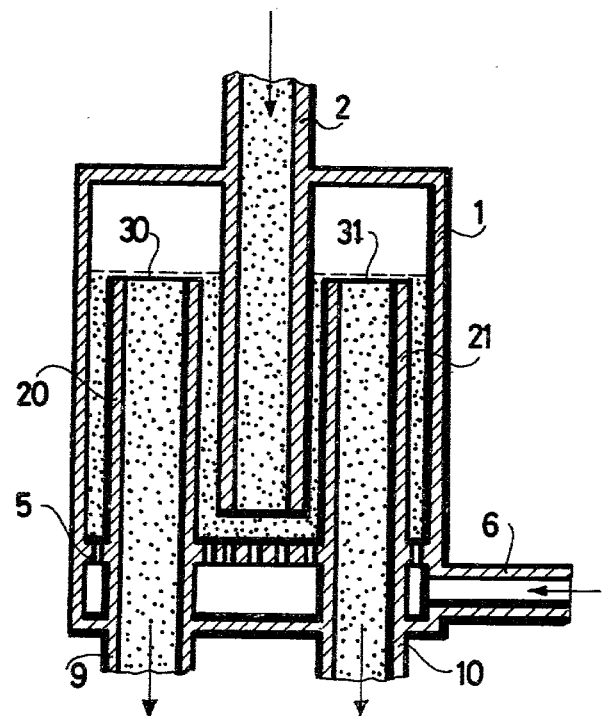
FIG. 2 shows a vertical sectional view of another embodiment.

The exemplified embodiment shown in FIG. 2 is distinguished from the previous one in that the outlets 3 and 4 of the former embodiment according to FIG. 1 are replaced by discharge edges 30 and 31 of upright pipes 20 and 21, respectively, which are build in the casing 1. Again, the discharge edges 30 and 31 are of the same level.

Figure 3:
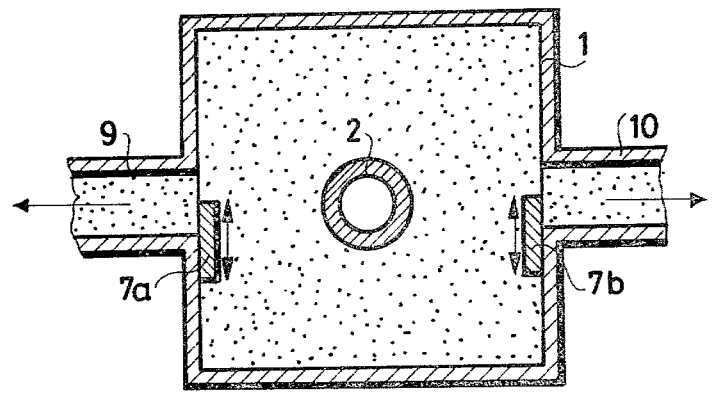
FIG. 3 illustrates a cross-sectional view of still another embodiment.

The exemplified embodiment illustrated in FIG. 3 is broadly similar to that shown in FIG. 1 with the exception, however, that it is provided with control plates 7a and 7b which are arranged for horizontal alternate movements independently of one another whereby the width of the openins 3 and 4 can be adjusted independently of one another.

Figure 4:
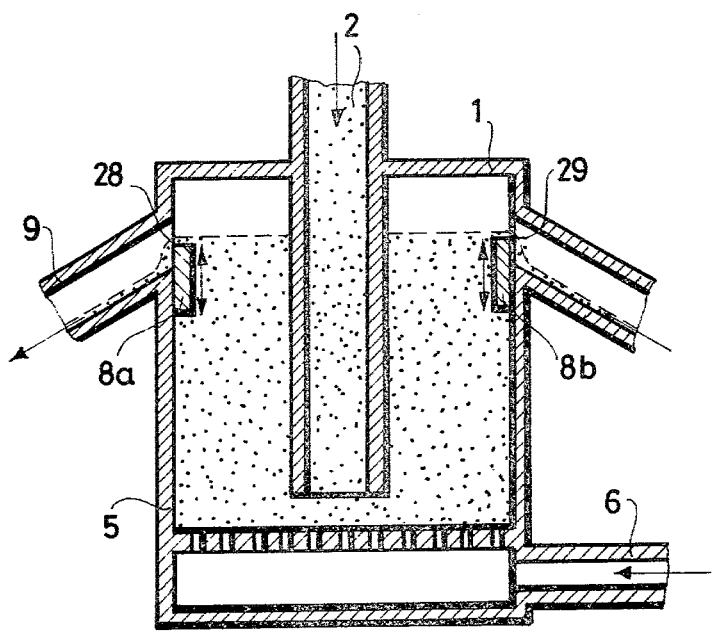
FIG. 4 represents a longitudinal sectional view of a further embodiment.

A similar solution is illustrated in FIG. 4 which is again similar to the exemplified embodiment represented in FIG. 1. However, the apparatus is provided with vertically displaceable control plates 8a and 8b at the dischargers or chutes 9 and 10, respectively. By adjusting the control plates 8a and 8b the discharge edges 28 and 29, respectively, can be caused to occupy positions at different levels.

Obviously, both types of control may be combined as will be apparent to the skilled art worker.

In operation, all exemplified embodiments of the powder distributor according to the invention have preheated hydrate continuously supplied to them through the inlet 2. At the same time, air is introduced through the air conduit 6 into the chamber beneath the permeable partition 5. Such air penetrates through the partition 5 into the chamber thereabove and fluidizes the hydrate within the casing 1, which then becomes continuously discharged therefrom through the outlets 3 and 4 along the chutes 9 and 10, respectively. The widths of the outlets 3 and 4 are either the same or different according to the ratio prescribed for both portions of the discharged hydrate.

By means of the control plates 7a and 7b it is possible to alter the ratio of both portions of the continuously discharged hydrate even during operation. Likewise, the control plates 8a and 8b permit one to increase or decrease the amount of hydrate which will be stored in the casing 1.

An employment of the powder distributor according to the invention in a conventional alumina calcination apparatus of the groups (a) and (b) as well as their operation will be described with reference to FIGS. 5 and 6.

Figure 5:
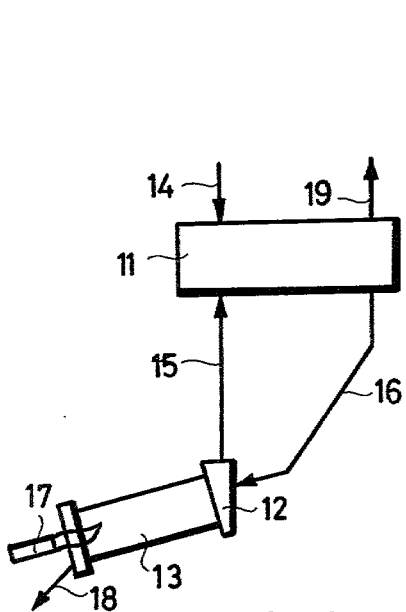
FIG. 5 shows a conventional alumina calcination apparatus of the above mentioned groups (a) and (b) diagrammatically.

The conventional apparatus illustrated in FIG. 5 comprises a hydrate supply system suggested by an arrow 14, a hydrate preheater 11, a channel 16 connecting the preheater 11 with an inlet box or casing 12, and a furnace 13 connected to the inlet box 12. The furnace 13 has a discharge channel connected to it and suggested by an arrow 18. Reference numeral 17 designates a burner which supplies thermal energy into the furnace 13. A discharge channel 15 connects the inlet box 12 with the preheater 11, a discharge channel of which is suggested by an arrow 19.

In operation, hydrate is continuously supplied by the hydrate supply system 14 into the hydrate preheater 11. Herefrom, the preheated hydrate flows through the channel 16 into the inlet box 12 wherefrom it enters the furnace 13. Calcined alumina will be discharged from the furnace 13 through the channel 18. The heat needed in the furnace 13 is supplied by the burner 17 as mentioned above. Waste gases escape from the furnace 13 via the inlet box 12 and the channel 15 into the preheater 11. There, the hydrate is preheated by such gases which then are discharged from the apparatus through the channel 19.

Figure 6:
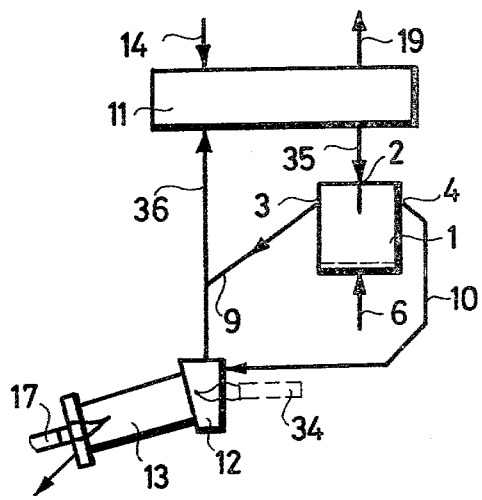
FIG. 6 is a diagrammatical view of the apparatus shown in FIG. 5 and complemented with a powder distributor according to the invention.

If the apparatus is complemented with the powder distributor according to the invention as shown in FIG. 6, then there is a further channel 35 which connects the hydrate preheater 11 with the casing 1 and is connected to the inlet 2 of the powder distributor. Furthermore, there is a channel 36 which connects the inlet box 12 with the hydrate preheater 11 in lieu of the channel 15 and has the chute 9 connected to it. Reference character 34 designates a burner which may be used optionally as will be described hereinbelow.

In operation, the preheated hydrate flows through the channel 35 and the inlet 2 into the casing 1 where it stays during a time interval dependent on the capacity thereof. A portion of the work material the amount of which depends on the mutual lengths of the discharge edges of the outlets 3 and 4, flows along the chute 9 into the channel 36 where it is carried upward by the waste gases coming from the inlet box 12 so that it is supplied back into the hydrate preheater 11. Here, the hydrate coming from the casing 1 is mixed with newly introduced hydrate supplied by the hydrate supply system 14. Another portion of the hydrate within the casing 1 withdraws through the chute 10 into the inlet box 12 and from there into the furnace 13. Air needed for fluidizing the hydrate within the casing 1 is supplied through the air conduit 6 while waste gases withdraw through the channel 19 of the hydrate preheater 11 as has been described above.

The conventional alumina calcination apparatus of the group (c) mentioned above shown in FIG. 7 comprises, in addition to already recited items, a reactor 22 provided with the burner 17. A channel 23 connects the reactor 22 with a separation cyclone 24 the discharge of which is connected to the channel 15. A further channel 25 connects the cyclone with an automatic lock 26 which opens into the discharge channel 18. The channel 25 is, by means of a further channel 27, connected with the reactor 22.

In operation, the hydrate supplied by the hydrate supply system 14 into the hydrate preheater 11 flows from here through the channel 16 into the reactor 22 where it becomes calcined by the heat supplied by the burner 17. Waste gases and calcined alumina withdraw through channel 23 into the cyclone 24 wherefrom the waste gases flow through the channel 15 into the hydrate preheater 11. Precipitated alumina flows through the channel 25 to the automatic lock 26 by which one portion thereof in the form of final product is discharged through the channel 18 while the other portion is caused to flow back through the channel 27 into the reactor 22.

Figure 7:
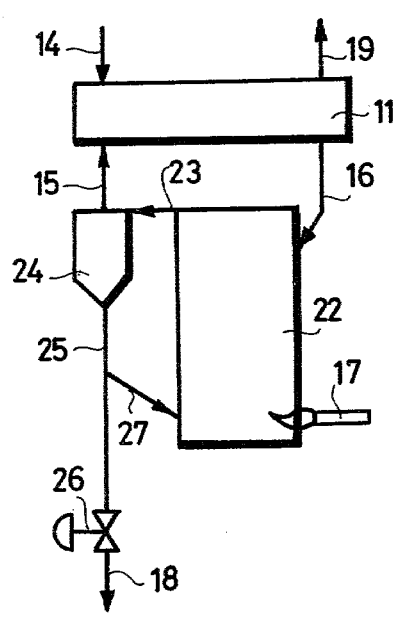
FIG. 7 illustrates a diagrammatical view of conventional alumina calcination apparatus of the above mentioned group (c).
Figure 8:
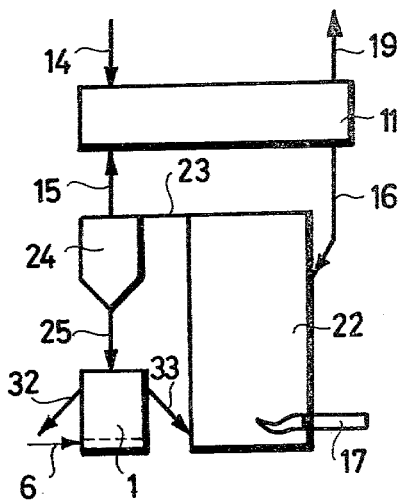
FIG. 8 is a diagrammatical view of an alumina calcination apparatus as shown in FIG. 7 yet complemented with a powder distributor according to the invention.

FIG. 8 shows a conventional alumina calcination apparatus as illustrated in FIG. 7 yet complemented with a powder distributor according to the invention. The latter is connected to the channel 25 extending from the cyclone 24. Their outlets are connected to discharge channels 32 and 33, respectively. Of these, channel 32 serves as a final product discharger whereas channel 33 is connected to the reactor 22 as was channel 27 in the conventional plant shown in FIG. 7.

In operation, the powder distributor according to the invention replaces the automatic lock 26 of the conventional devices. It receives the material coming from the cyclone 24 and permits it to stay within the casing 1 during a time period determined by the storing capacity of the powder distributor which, in turn, is defined by the discharge areas of the outlets referred to above by reference characters 3 and 4. The other portion of the work material flows through the channel 33 back into the reactor 22.

EXAMPLE 1

The conventional plant shown in FIG. 5 has a furnace 13 with a capacity of about 20,000 kilograms per hour alumina. The amount of work material or hydrate supplied by the hydrate supply system 14 into the hydrate preheater 11 is about 35,550 kilograms per hour having a temperature of about 65 degrees centigrade, and adhering moisture content of about 12%, the heating losses being about 0.5% and the powder losses being about 3.6 kilograms per hour. Through the channel 16 an intermediary product of a temperature of about 400 degrees centigrade flows into the inlet box 12. The alumina in the furnace 13 reaches a temperature of about 1200 degrees centigrade. Cooled down alumina withdraws from the system through the channel 18. The alumina thus produced consists of 70 to 80% Alpha modification and of 30 to 20% Gamma modification.

EXAMPLE 2

A similar amount of hydrate of the same quality as in the preceding example flows from the hydrate preheater 11 through the channel 35 and the inlet 2 into the casing 1 of the powder distributor according to the invention with which the plant is complemented as shown in FIG. 6. The material passes a time interval of about 30 minutes determined by the storing capacity of the casing 1 in the powder distributor. Thereafter, about 50% of the material flows through the outlet 3 along the chute 9 into the channel 36. Here waste gases withdrawing from the inlet box carry the material back into the hydrate preheater 11 where it becomes mixed with newly introduced hydrate. Thereby, there is a continuous supply of work material into the casing 1 at a temperature of about 500 degrees centigrade. The other 50% of the work material withdraws through the outlet 4 and along the chute 10 into the inlet box 12. Under such circumstances the alumina leaving the furnace 13 through the channel 18 as a final product will consist of 50 to 55% of Alpha modification, and 50 to 45% of Gamma modification.

EXAMPLE 3

Taking the same initial values as in the previous example yet employing an additional heating by means of the burner 34 connected to the inlet box 12, the intermediary products coming from the powder distributor are heated to a temperature of about 800 degrees centigrade. Average time interval of dwell within the casing 1 amounts to about 30 minutes. 20 to 30% of the final product which withdraws from the furnace 13 through the channel 18 consists of Alpha modification while the remaining 80 to 70% is formed by Gamma modification.

EXAMPLE 4

A hydrate with the initial properties as in the previous example flows from the hydrate preheater 11 of the embodiment shown in FIG. 8 through the channel 16 into the reactor 22 wherefrom it withdraws through the channel 23 into the cyclone 24 and from here into the casing 1 of the powder distributor according to the invention. In the casing 1 the hydrate will be fluidized by the air introduced through the air conduit 6. Dependent on the ratio of the lengths of the discharge edges referred to above by reference characters 28 and 29 and/or 30 and 31, respectively, as the case may be, about 45% of the hydrate flows through the channel 33 back into the reactor 22 while 55% withdraws as final product through the channel 32 into a cooling system. The resulting alumina contains about 20% Alpha modification and about 80% Gamma modification.

What is claimed is:

1. A self-adjusting powder distributor for alumina calcination apparatus comprising a closed casing, a powder fluidizing bottom in said casing, an inlet for supplying hydrate into the casing above said fluidizing bottom, outlets in said casing having discharge edges at the same level for distributing the hydrate from said casing to various places at a constant ratio, at least one of the outlets having means for altering its flow area and, thereby, the ratio of flow therethrough with respect to the other outlets, and means for altering the common level of said discharge edges and, thereby, the inventory of said hydrate in the distributor while maintaining said discharge edges always at a common level.

2. A distributor as claimed in claim 1, said means for altering the common level of said discharge edges comprising control plates individual to each said outlet and movable simultaneously vertically relative to said outlets, the upper edges of said control plates defining said common level.

* * * * *